(12) United States Patent
Nessel et al.

(10) Patent No.: US 10,444,711 B2
(45) Date of Patent: Oct. 15, 2019

(54) APPARATUS COMPRISING ELECTROMECHANICAL DEVICE AND MOTION DETECTOR AND METHOD FOR OPERATING APPARATUS

(71) Applicant: Sanofi-Aventis Deutschland GmbH, Frankfurt am Main (DE)

(72) Inventors: Christian Nessel, Frankfurt am Main (DE); David Moore, Leicestershire (GB)

(73) Assignee: Sanofi-Aventis Deutschland GmbH, Frankfurt am Main (DE)

( * ) Notice: Subject to any disclaimer, the term of this patent is extended or adjusted under 35 U.S.C. 154(b) by 119 days.

(21) Appl. No.: 14/394,459

(22) PCT Filed: Apr. 24, 2013

(86) PCT No.: PCT/EP2013/058498
§ 371 (c)(1),
(2) Date: Oct. 14, 2014

(87) PCT Pub. No.: WO2013/160351
PCT Pub. Date: Oct. 31, 2013

(65) Prior Publication Data
US 2015/0268642 A1    Sep. 24, 2015

(30) Foreign Application Priority Data
Apr. 25, 2012  (EP) .................................. 12165544

(51) Int. Cl.
*G05B 11/32*  (2006.01)
*G05D 7/06*   (2006.01)
(Continued)

(52) U.S. Cl.
CPC .............. *G05B 11/32* (2013.01); *G05B 15/02* (2013.01); *G05D 7/0676* (2013.01); *H02K 7/116* (2013.01);
(Continued)

(58) Field of Classification Search
CPC ........... G05B 15/02; G05B 11/32; H02P 8/16; H02P 8/38; G05D 7/0676
(Continued)

(56) References Cited

U.S. PATENT DOCUMENTS 533,575 A     2/1895   Wilkens
4,547,733 A * 10/1985  Thoraval .................. G01V 3/30
                                              324/338
(Continued)

FOREIGN PATENT DOCUMENTS

CN    102023025 A    4/2011
EP    0937471 A2     8/1999
(Continued)

OTHER PUBLICATIONS www.Motion-Designs.com, "Design Trends Brushless Motor COommutaion", May 2008, pp. 1-14.*
(Continued)

*Primary Examiner* — Brian W Wathen
*Assistant Examiner* — Olvin Lopez Alvarez
(74) *Attorney, Agent, or Firm* — McCarter & English, LLP

(57) ABSTRACT

The invention relates to an apparatus comprising an electromechanical device, a control unit and a motion detector, wherein said electromechanical device is controllable by said control unit via a control signal, wherein said motion detector is configured such that said mechanical movement of said electromechanical device is determined and wherein said motion detector provides a motion detector signal. The
(Continued)

invention also relates to a method for operating an electromechanical device. The technical problem of providing an apparatus with an electromechanical device, the reliability as well as the power consumption of which is improved, is solved in that the control unit is configured such that it can be influenced by the phase difference between the control signal and the motion detector signal. The technical problem is also solved by a method for operating an apparatus, in particular an apparatus according to the invention, comprising the steps of running an electromechanical device with a control signal, producing a motion detector signal from a mechanical movement of said electromechanical device and influencing said control signal in dependence of said phase difference between said control signal and said motion detector signal.

13 Claims, 5 Drawing Sheets

Specification includes a Sequence Listing.

(51) Int. Cl.
| | | |
|---|---|---|
| G05B 15/02 | (2006.01) | |
| H02P 8/16 | (2006.01) | |
| H02P 8/38 | (2006.01) | |
| H02K 7/116 | (2006.01) | |
| H02K 11/22 | (2016.01) | |

(52) U.S. Cl.
CPC .............. *H02K 11/22* (2016.01); *H02P 8/16* (2013.01); *H02P 8/38* (2013.01)

(58) Field of Classification Search
USPC .......................................................... 700/282
See application file for complete search history.

(56) References Cited

U.S. PATENT DOCUMENTS

| | | | |
|---|---|---|---|
| 4,904,917 A * | 2/1990 | Hakluytt | H02P 8/04 318/257 |
| 5,130,626 A * | 7/1992 | Kajitani | H02P 7/293 318/599 |
| 5,226,895 A | 7/1993 | Harris | |
| 5,279,586 A | 1/1994 | Balkwill | |
| 5,304,152 A | 4/1994 | Sams | |
| 5,320,609 A | 6/1994 | Haber et al. | |
| 5,334,923 A * | 8/1994 | Lorenz | H02P 6/187 318/805 |
| 5,349,278 A * | 9/1994 | Wedeen | B60L 15/20 318/432 |
| 5,383,865 A | 1/1995 | Michel | |
| 5,477,121 A * | 12/1995 | Sirjola | H02P 23/08 318/799 |
| 5,480,387 A | 1/1996 | Gabriel et al. | |
| 5,505,704 A | 4/1996 | Pawelka et al. | |
| 5,582,598 A | 12/1996 | Chanoch | |
| 5,626,566 A | 5/1997 | Petersen et al. | |
| 5,642,461 A * | 6/1997 | Lewis | H02P 6/06 318/600 |
| 5,674,204 A | 10/1997 | Chanoch | |
| 5,688,251 A | 11/1997 | Chanoch | |
| 5,876,380 A * | 3/1999 | Manganini | A61M 5/001 604/191 |
| 5,921,966 A | 7/1999 | Bendek et al. | |
| 5,961,495 A | 10/1999 | Walters et al. | |
| 6,004,297 A | 12/1999 | Steenfeldt-Jensen et al. | |
| 6,166,514 A * | 12/2000 | Ando | B60L 15/025 318/727 |
| 6,193,698 B1 | 2/2001 | Kirchhofer et al. | |
| 6,208,107 B1 | 3/2001 | Maske et al. | |
| 6,221,046 B1 | 4/2001 | Burroughs et al. | |
| 6,235,004 B1 | 5/2001 | Steenfeldt-Jensen et al. | |
| 6,248,095 B1 | 6/2001 | Giambattista et al. | |
| 6,388,416 B1 * | 5/2002 | Nakatani | H02P 6/085 318/700 |
| 6,899,698 B2 | 5/2005 | Sams | |
| 6,936,032 B1 | 8/2005 | Bush, Jr. et al. | |
| 6,995,679 B2 * | 2/2006 | Eskritt | B62D 5/065 340/686.1 |
| 7,185,528 B2 * | 3/2007 | Bristol | F04B 49/20 388/809 |
| 7,241,278 B2 | 7/2007 | Moller | |
| 7,633,256 B2 * | 12/2009 | Reichert | G02B 26/122 318/602 |
| 8,100,668 B2 * | 1/2012 | Yoo | F04B 35/045 318/135 |
| 8,206,317 B2 * | 6/2012 | Freeman | G06F 19/00 600/583 |
| 2002/0052578 A1 | 5/2002 | Moller | |
| 2002/0120235 A1 | 8/2002 | Enggaard | |
| 2002/0176333 A1 * | 11/2002 | Lin | G11B 7/0945 369/44.29 |
| 2003/0050609 A1 | 3/2003 | Sams | |
| 2003/0208157 A1 * | 11/2003 | Eidson | A61D 7/00 604/131 |
| 2004/0059299 A1 | 3/2004 | Moller | |
| 2004/0064088 A1 * | 4/2004 | Gorman | A61M 5/14276 604/93.01 |
| 2004/0210199 A1 | 10/2004 | Atterbury et al. | |
| 2004/0267207 A1 | 12/2004 | Veasey et al. | |
| 2005/0006572 A1 * | 1/2005 | Kojima | G01D 5/34707 250/231.13 |
| 2005/0113765 A1 | 5/2005 | Veasey et al. | |
| 2005/0236561 A1 * | 10/2005 | Hin | G01D 5/366 250/231.13 |
| 2006/0087263 A1 * | 4/2006 | Sa | D06F 37/304 318/66 |
| 2006/0153693 A1 | 7/2006 | Fiechter et al. | |
| 2006/0202114 A1 * | 9/2006 | Ruttiger | G01D 5/3473 250/231.13 |
| 2007/0290639 A1 * | 12/2007 | Mori | H02P 6/28 318/400.42 |
| 2008/0156973 A1 * | 7/2008 | Wong | G01D 5/36 250/231.16 |
| 2008/0290261 A1 * | 11/2008 | Doe | G01D 5/3473 250/221 |
| 2009/0080578 A1 * | 3/2009 | Naniwada | H04B 1/123 375/346 |
| 2009/0207957 A1 * | 8/2009 | Fukuda | H03L 7/081 375/354 |
| 2009/0275916 A1 | 11/2009 | Harms et al. | |
| 2009/0303478 A1 * | 12/2009 | Haddock | G07D 5/10 356/337 |
| 2010/0185152 A1 * | 7/2010 | Larsen | A61M 5/1452 604/154 |
| 2011/0057822 A1 | 3/2011 | Watahiki | |
| 2011/0114829 A1 * | 5/2011 | Lee | H03M 1/206 250/231.13 |
| 2011/0227518 A1 * | 9/2011 | Inoue | G01D 5/3473 318/400.4 |
| 2011/0273725 A1 * | 11/2011 | Milvich | G01D 5/24476 356/616 |
| 2012/0016303 A1 * | 1/2012 | Ohta | A61M 5/007 604/131 |
| 2012/0031513 A1 * | 2/2012 | Gordon | A61M 5/16877 137/551 |
| 2012/0035472 A1 * | 2/2012 | Bruce | A61M 5/007 600/432 |
| 2012/0116311 A1 * | 5/2012 | Bruggemann | A61M 5/14244 604/154 |
| 2012/0138781 A1 * | 6/2012 | Rai | G01D 5/36 250/231.13 |
| 2012/0165747 A1 * | 6/2012 | Lanin | A61M 5/14244 604/207 |
| 2012/0245560 A1 * | 9/2012 | Hochman | A61M 5/20 604/518 |

(56) References Cited

U.S. PATENT DOCUMENTS

| | | | | |
|---|---|---|---|---|
| 2012/0330228 A1* | 12/2012 | Day | ............ | A61M 5/14244 604/82 |
| 2013/0253465 A1* | 9/2013 | Holtwick | ............ | A61M 5/19 604/411 |
| 2014/0330206 A1* | 11/2014 | Moore | ............ | A61M 5/19 604/152 |
| 2018/0093039 A1* | 4/2018 | Estes | ............ | A61B 34/10 |

FOREIGN PATENT DOCUMENTS

| | | | | |
|---|---|---|---|---|
| EP | 0937476 | A2 | | 8/1999 |
| EP | 1041708 | A2 | | 10/2000 |
| EP | 2335755 | A1 | | 6/2011 |
| FR | 2524171 | A2 | | 9/1983 |
| JP | S61-161998 | A | | 7/1986 |
| JP | H099666 | | * 1/1997 | ............ H02P 29/00 |
| JP | H11-341854 | A | | 12/1999 |
| JP | 2001-78477 | A | | 3/2001 |
| JP | 2007202336 | B | | 8/2007 |
| WO | 9938554 | A1 | | 8/1999 |
| WO | 0110484 | A1 | | 2/2001 |
| WO | 2011067187 | A1 | | 6/2011 |

OTHER PUBLICATIONS

Aerotech, "What Is Commutation and How Does It Affect Linear Motor Performance", Aug. 2012, http://motioncontrol.aerotech.com/2012/08/08/commutation-and-linear-motors/, pp. 5.*
FR2524171, "Automatic medical syringe with frequency controlled drive motor—has programmable timer to select optional injection quantity control factors, Machine Translation", Sep. 30, 1983, pp. 7.*
Wikipedia, "Pulse (Signal processing)", Jun. 14, 2017, pp. 2.*
PC control, "Incremental Encoders" , 2006, pp. 1. (Year: 2006).*
Tadashi et al, "Driving Mechanism for Rotation and Its Method" Machine translation for JPH11341854, pp. 44. (Year: 1999).*
Gabay, "Motion Sensing Via Rotary Shaft Encoders Assures Safety and Control", Aug. 2012, pp. 6. retrieved from the internet at https://www.digikey.conn/en/articles/techzone/2012/aug/motion-sensing-via-rotary-shaft-encoders-assures-safety-and-control (Year: 2012).*
Chinese Search Report for Chinese Patent Application No. 201380020075.X, dated Jun. 13, 2016, pp. 2.
English Translation of Abstract of Japanese Patent Application No. H11-341854 dated Jan. 26, 2018, pp. 1.

* cited by examiner

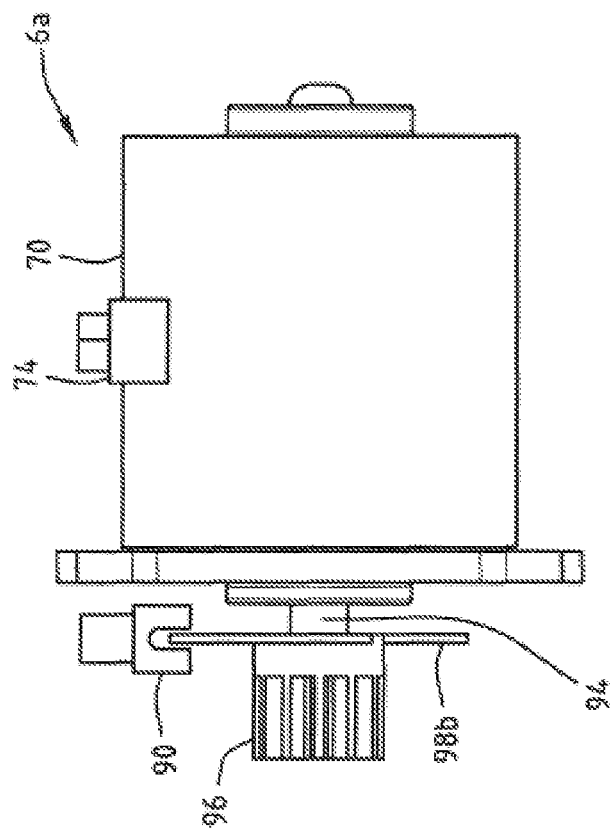
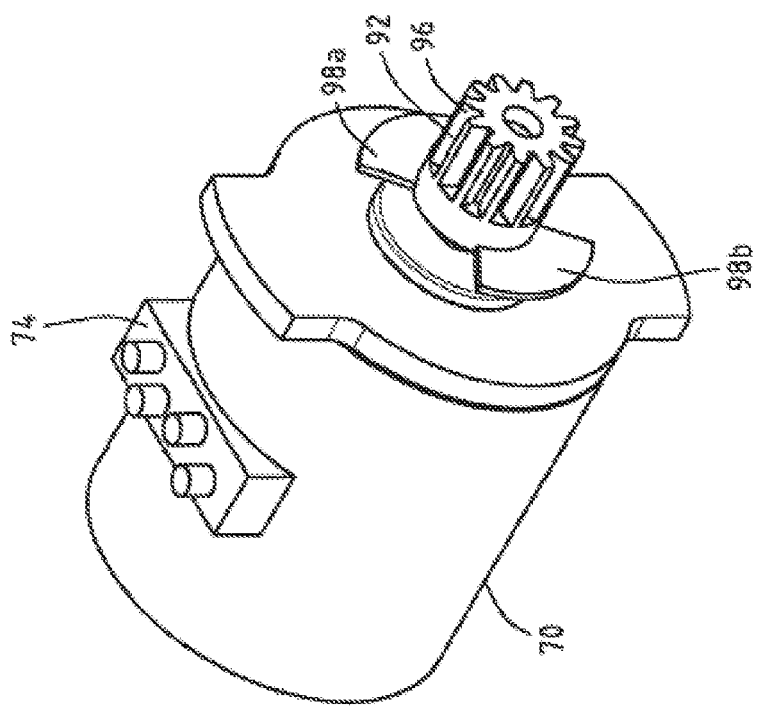
FIG. 8A
FIG. 8B

APPARATUS COMPRISING ELECTROMECHANICAL DEVICE AND MOTION DETECTOR AND METHOD FOR OPERATING APPARATUS

CROSS REFERENCE TO RELATED APPLICATIONS

The present application is a U.S. National Phase Application pursuant to 35 U.S.C. § 371 of International Application No. PCT/EP2013/058498 filed Apr. 24, 2013, which claims priority to European Patent Application No. 12165544.3 filed Apr. 25, 2012. The entire disclosure contents of these applications are herewith incorporated by reference into the present application.

FIELD OF INVENTION

The invention relates to an apparatus comprising an electromechanical device, a control unit configured to control the electromechanical device by a control signal and a motion detector configured to provide a motion detector signal, wherein said motion detector is configured such that said mechanical movement of said electromechanical device is determined. The invention also relates to a method for operating an electromechanical device.

BACKGROUND

It is known from the state of the art, to use electromechanical devices for example to provide a mechanical movement by means of electrical energy. It is also known to monitor such mechanical movements with motion detectors. This can increase the assurance that a certain movement of the electromechanical device has indeed happened, thus reducing the probability of unregistered errors of devices in which such electromechanical devices are used. Here, an error would mean that the electromechanical device is not moving though a control signal was sent or the other way around, for example. It is disadvantageous though, that in doing so the error is only detected after it has happened.

SUMMARY

With any mechanical drive system, one may wish to accomplish a number of different functions. One common functional aim is 'position control', where there is an input position demand, and the output shall follow the position demand.

Another function aim can be 'force control', where there is an input force (or torque) demand, and it is required that the drive system applies this force (or torque) accurately to the output. With either of these, the capability of the device to follow the position or force demand will be limited by the output force (or torque) capability of the drive system. Obviously, if there is a large load at the output, it may occur that the motor cannot drive the (too) large load, so that the output will not follow the position demand or force demand.

There are numerous reasons why an electromechanical device would not follow the control signal. There might be malfunctions or the load on the mechanical device might be too large for the electromechanical device to move in the expected way. Especially to overcome the latter problem, it is possible, for example, to over-engineer such systems and provide an electromechanical device, which is in every case strong enough to drive the load. However, this may result in much higher cost and much higher consumption of energy and space.

Especially for stepper motors, there is the problem of so called slipping and stalling. In the case of stepping motors (and brushed DC motors) there is no easily measured motor parameter that indicates the magnitude of the load that the motor is driving. The current drawn by the motor phases is approximately constant irrespective of the load that the motor is driving. There are complex interactions between the applied phase voltage, the motor phase current, and also the back-EMF of the motor, which may be dependent upon the motor speed. The motor phase current and phase voltages may also be discontinuous (e.g. they change during every step) and so are difficult to measure accurately.

If the stepper motor slips a step, it does not perform the step even though a control signal for the step was sent. In an extreme case, the stepper motor stalls. Then the load is too high and the stepper motor does not merely slip one or more steps, but does not move at all. Stepper motors, and also brushless DC motors, can be driven with a low current (or voltage), in which case they stall at a low torque, or at a higher (or maximum) current (or voltage), in which case they stall at a higher torque (or even the maximum) torque. Evidently, stalling is less likely to happen if the current (or voltage) is high, but a higher current (or voltage) uses more power, and also causes the motor to heat up more. In some cases, the high current (or voltage) cannot be maintained for long, because it causes excessive heating of the motor.

In certain embodiments, the motor may slip steps in groups of four, for example four, eight, or twelve steps.

In many applications, especially in the field of medical devices though, it is of high importance to provide a device, which has a very low failure rate, which is not susceptible to errors and malfunctioning, for example by preventing slipping and stalling, and at the same time keeps power consumption as low as possible. This may be relevant for portable devices, since only a limited amount of energy can be provided by a portable power source before it is exhausted and recharging becomes necessary.

This is in particular the case for medical devices capable of delivering one or more drug agents from one or more reservoirs. Such drug agents may comprise a first and—optionally—a second medicament. The medical device includes a dose setting mechanism for delivering the drug agents automatically or manually by the user.

The medical device can be an injector, for example a hand-held injector, especially a pen-type injector, that is an injector of the kind that provides for administration by injection of medicinal products from one or more multidose cartridges. In particular, the present invention relates to such injectors where a user may set the dose.

The drug agents may be contained in one, two or more multiple dose reservoirs, containers or packages, each containing independent (single drug compound) or pre-mixed (co-formulated multiple drug compounds) drug agents.

Certain disease states require treatment using one or more different medicaments. Some drug compounds need to be delivered in a specific relationship with each other in order to deliver the optimum therapeutic dose. The present patent application is of particular benefit where combination therapy is desirable, but not possible in a single formulation for reasons such as, but not limited to, stability, compromised therapeutic performance and toxicology.

For example, in some cases it may be beneficial to treat a diabetic with a long acting insulin (also may be referred to as the first or primary medicament) along with a glucagon-like peptide-1 such as GLP-1 or GLP-1 analog (also may be referred to as the second drug or secondary medicament).

Accordingly, there exists a need to provide devices for the delivery of two or more medicaments in a single injection or delivery step that is simple for the user to perform without complicated physical manipulations of the drug delivery device. The proposed drug delivery device provides separate storage containers or cartridge retainers for two or more active drug agents. These active drug agents are then combined and/or delivered to the patient during a single delivery procedure. These active agents may be administered together in a combined dose or alternatively, these active agents may be combined in a sequential manner, one after the other.

The drug delivery device also allows for the opportunity of varying the quantity of the medicaments. For example, one fluid quantity can be varied by changing the properties of the injection device (e.g., setting a user variable dose or changing the device's "fixed" dose). The second medicament quantity can be changed by manufacturing a variety of secondary drug containing packages with each variant containing a different volume and/or concentration of the second active agent.

The drug delivery device may have a single dispense interface. This interface may be configured for fluid communication with a primary reservoir and with a secondary reservoir of medicament containing at least one drug agent. The drug dispense interface can be a type of outlet that allows the two or more medicaments to exit the system and be delivered to the patient.

The combination of compounds from separate reservoirs can be delivered to the body via a double-ended needle assembly. This provides a combination drug injection system that, from a user's perspective, achieves drug delivery in a manner that closely matches the currently available injection devices that use standard needle assemblies. One possible delivery procedure may involve the following steps:

1. Attach a dispense interface to a distal end of the electro-mechanical injection device. The dispense interface comprises a first and a second proximal needle. The first and second needles pierce a first reservoir containing a primary compound and a second reservoir containing a secondary compound, respectively.

2. Attach a dose dispenser, such as a double-ended needle assembly, to a distal end of the dispense interface. In this manner, a proximal end of the needle assembly is in fluidic communication with both the primary compound and secondary compound.

3. Dial up/set a desired dose of the primary compound from the injection device, for example, via a graphical user interface (GUI).

4. After the user sets the dose of the primary compound, the micro-processor controlled control unit may determine or compute a dose of the secondary compound and preferably may determine or compute this second dose based on a previously stored therapeutic dose profile. It is this computed combination of medicaments that will then be injected by the user. The therapeutic dose profile may be user selectable. Alternatively, the user can dial or set a desired dose of the secondary compound.

5. Optionally, after the second dose has been set, the device may be placed in an armed condition. The optional armed condition may be achieved by pressing and/or holding an "OK" or an "Arm" button on a control panel. The armed condition may be provided for a predefined period of time during which the device can be used to dispense the combined dose.

6. Then, the user will insert or apply the distal end of the dose dispenser (e.g. a double ended needle assembly) into the desired injection site. The dose of the combination of the primary compound and the secondary compound (and potentially a third medicament) is administered by activating an injection user interface (e.g. an injection button).

Both medicaments may be delivered via one injection needle or dose dispenser and in one injection step. This offers a convenient benefit to the user in terms of reduced user steps compared to administering two separate injections.

In view of the aforementioned, the invention faces the technical problem of providing an apparatus with an electromechanical device, the reliability as well as the power consumption of which is improved.

The technical problem is solved in that the control unit is configured such that the control signal can be influenced by the phase difference between the control signal and the motion detector signal.

Some electromechanical devices, like stepper motors or brushless DC-motors, may show the property that there is a delay or phase difference between the control signal and the actual movement of the motor. In case of a stepper motor, the control signal may consist of individual pulses, or for example a train of pulses, each indicating a so called step causing the stepper motor to perform a mechanical movement, or more precisely causing the rotor of the stepper motor to rotate through a certain number of degrees. Thus, the control signal carries a phase information, be it implicitly or explicitly, for example by a signal edge, which relates to the time, or an expected time, that a step of the motor shall be performed.

If there is no load on such electromechanical devices, there is substantially no or only a short delay between the control signal and the actual movement of the electromechanical device. If the load on the motor increases the delay between the control signal and the actual movement increases. With the motion detector this motion or movement of the electromechanical device can be converted or encoded into a motion detector signal. The delay between the control signal and the actual movement of the electromechanical device can then be expressed in terms of a phase difference between these two signals.

It was found that, in particular for stepper motors, there is a relationship between an increasing load on the motor in terms of a resisting torque or momentum and the phase difference between the control signal and the motion detector signal. For a stepper motor this relation is substantially linear.

Thus, the control signal can be influenced by the phase difference in order for the control unit to provide a control signal to the electromechanical device, which is optimally adjusted to the load or resisting torque on the electromechanical device. This results in an improved reliability of operating the electromechanical device and at the same time saving energy, since the electromechanical device only needs to provide enough exerted torque to overcome the resisting torque.

By influencing or adjusting the control signal it is understood that the control signal is for example adjusted with respect to its frequency or to the amplitude or the shape of its pulses (in the case where the signal consist of pulses). It is also possible that the control signal is turned off completely and no further pulses are issued for security reasons, when the load on the electromechanical device becomes too high, for instance. The way the control signal is adjusted depends on the specific type of electromechanical device and on how the specific electromechanical device is controlled or driven.

The reason for the effect on the phase difference, at least in case a stepper motor is provided, is that due to the torque by the load on the electromechanical device the magnetic fields in the electromechanical device are distorted. This results in a certain delay for the stepper motor to actually perform the step indicated by the control signal. This delay depends upon the mechanical load (in terms of torque) upon the motor and is approximately proportional to it.

By configuring the control unit according to the invention such that the control signal can be influenced by the phase difference between the control signal and the motion detector signal, it is on the one hand possible not only to detect errors or slips of the electromechanical device, but also to prevent any unwanted malfunctioning of the apparatus according to the invention. Since an increasing delay can be interpreted as an increasing resistive torque, counter measures can be initiated early enough to prevent the electromechanical device from any errors in the form of slipping or stalling, for example. Such counter measure can be an increased current to increase the exerted torque of the motor or a warning signal to the user, for example. At the same time it is possible on the other hand to adjust and thus reduce the power consumption of the apparatus according to the invention, since a small phase difference may indicate an unnecessary large current of the electromechanical device resulting in wasted energy, which will be lost by dissipation, for example. Thus, the pulse current may be reduced, or the length or shape of the pulse may be reduced in order to provide less—but still sufficient—energy for the movement of the motor. Moreover, an adjusted control signal also results in longer lifetimes of the constructional elements, in particular the electromechanical device and loaded parts like a drive train for example, since stress, strain and operational demands are lower on these parts, if the electromechanical device is not constantly operated at maximum or a higher level of power.

Especially if the electromechanical device is powered by a battery, for example a lithium ion battery, a low power consumption is important.

Even though the electromechanical device is preferably a rotation motor, it is also conceivable to provide a linear motor, for example.

A microprocessor can be used as the control unit for the electromechanical device. The microprocessor can also be used for other tasks. It is, of course, also possible to provide a dedicated control unit, such as a motor driver, for the electromechanical device.

According to an embodiment of the apparatus according to the invention, the control unit is configured such that the current of the control signal can be altered depending on the phase difference between the control signal and the motion detector signal.

By influencing the control signal such that the current (or voltage) is altered, an easy way to adjust the power to the electromechanical device is provided. Most electromechanical devices, such as stepper motors or brushless DC-motors, can be adjusted in this way. There are different ways of altering the current. In case of a stepper motor, the amplitude of the current of the single pulses directly influences the maximum torque or load that the stepper motor may drive and still output the step. Instead of altering the amplitude of the current, the single pulses to control a stepper motor might also be reduced to reduce the effective power (or the energy per step) submitted to the stepper motor. Such a reduction of the pulse width may be realized by pulse width modulation. By modifying the pulse width modulation, the effective power (or energy per step) may be adjusted accordingly. Due to the discrete steps of a stepper motor, the correlation of the control signal and the motion detector signal (both of which show discrete steps) is facilitated compared to other motors.

A minimal but still sufficient current can then be used to ensure that the exerted torque or momentum by the motor is sufficient to overcome the resisting torque and at the same time the supplied current is small enough not to waste any energy. As a result, the reliability as well as the power consumption is further improved.

The electromechanical device may drive a drive train. Such a drive train can include a gearing arrangement and/or a driving rod. This way a rotational movement of the electromechanical device can be transformed into a lateral movement. By providing a gearing arrangement the precision and the exerted torque of the motor can also be influenced to further improve the reliability and power consumption by making the electromechanical device operate at an optimal working point, for example.

When the motion detector according to another embodiment of the apparatus according to the invention comprises at least an emission source (for example a light source), a detector and an interrupting plate that lies between the two, a space saving motion detector with low power consumption can be provided. With the interrupting plate arranged between the emission source and the detector, the emission source can be alternately covered and uncovered by the mechanical movement of the electromechanical device. This may be realized by an arrangement of flags mounted on a pinion of the electromechanical device, or a separate disc having flags such that the flags cover and uncover the detector or the emission source. Of course, the mechanical movement can also be detected at other positions within the drive train. Depending on the number of flags there may not necessarily be a one-to-one relation between pulses in the control signal and pulses in the motion detector signal. The detector is in this sense an encoder, encoding the mechanical movement or a light signal into an electrical signal.

Preferably two detectors are used and one emission source is used. Thus a single interrupting flag can produce four edges in the motion detector signal with one flag passing the detector. Since there are two detectors and two edges of a flag, this results in four distinguishable signals from the two detectors when a flag passes the two detectors. This way the resolution of the motion detector can be increased and thus the accuracy and speed of detecting changing loads in both directions on the electromechanical device is improved.

Preferably, the number of distinguishable signals received from the motion detector per revolution of the motor is equal to the number of pulses from the control unit that produces one revolution of the motor. Alternatively, the two are in a simple ratio. For example, the number of pulses per revolution from the control unit is an integer multiple of the number of distinguishable signals received from the motion detector.

The emission source is preferably a light source like an LED for example, while the detectors are light detectors.

The reliability of determining the phase difference between the control signal and the motion detector signal is improved, when a unit to average multiple phase differences between control signal and motion detector signal is provided. Such a unit does not necessarily need to be a separate unit, but such a unit can also be within the control unit, for instance.

Because of errors and jitter in the measurements of the phase difference, an averaged phase difference is less prone to such statistical errors or manufacturing tolerances, since the statistical errors and tolerances largely cancel each other during averaging. Thus, a more reliable and stable phase difference can be determined leading to a more precise influence on the control signal. Such means can be any kind of processing unit or within the control unit, for example.

Averaging 4, 8 or 12 phase differences is preferred, when there are four signals per interrupting flag of the optical encoder. It has been shown that multiples of 4 in this case yield the best reduction of measurement errors. Increasing the number of averaged phase differences improves the accuracy, though it reduces the speed with which the phase difference is determined.

It is especially preferred, when as a measure for the phase difference between the control signal and the motion detector signal the area between step-functions is determined, wherein steps in the step-function represent steps instructed by the control signal and steps detected by the motion detector. In case the phase difference increases, the area between the step-function increases as well and vice versa. The averaging of multiple phase differences can in this way effectively be implemented and saves computing power.

According to another embodiment of the invention the control signal is adjusted such that the exerted torque of said electromechanical device always exceeds the resisting torque on said electromechanical device. Thus, the electromechanical device is prevented from stalling. By making sure that the torque or momentum exerted by the electromechanical device is always larger than the resisting torque or momentum, the electromechanical device is effectively prevented from stalling. The reliability of the apparatus is thus maximized while at the same time there is no need for running the electromechanical device with maximum power to prevent it from stalling when the load is low.

According to another embodiment the apparatus is a medical device, in particular a portable medical device, for delivering at least one fluid, in particular a drug delivery device. Especially for medical devices an accurate dose delivery of a certain medicament is of great importance, since over and under dosages are not desired. Thus, if a fluid, in particular a medicament or a drug, is delivered by the movement of the electromechanical device, it is important to provide a reliable and predictable movement of the electromechanical device. Especially for a portable medical device an economical power usage is important, as well. Since for user convenience an infrequent recharging should be aimed at and at the same time the proper working of the portable medical device has to be guaranteed.

According to another embodiment of the apparatus according to the invention, the apparatus further comprises at least a first reservoir containing a first fluid and a fluidic channel connected at least to the first reservoir. The electromechanical device is configured such that it can exert a pressure at least on the first fluid in the first reservoir such that the fluid is guided through the fluidic channel. It is especially problematic to predict and provide the right amount of torque or force for the electromechanical device to provide the pressure on the fluid, since the necessary torque depends on multiple factors like the viscosity of the fluid, the diameter of the channel or the ambient temperature, for example. An adjusted control signal, influenced by the phase difference between the control signal and the motion detector signal allows for a reliable operation with low power consumption.

It is further preferred, that the apparatus further comprises a second reservoir containing a second fluid and a fluidic channel connected at least to the second reservoir. The electromechanical device is configured such that it can exert a pressure on the second fluid in the second reservoir such that the second fluid is guided through the fluidic channel. In this case it is especially preferred, when a second electromechanical device and/or a second control unit and/or a second motion detector is used, as well. In this way two different fluids, in particular drugs or medicaments, can be delivered to the user, preferably independently from each other. The reservoirs are preferably provided in the form of exchangeable cartridges.

According to another embodiment, it is preferred that the apparatus further comprises a drive train, wherein said electromechanical device drives said drive train to exert pressure on said first fluid. Such a drive train may contain a pinion and/or a piston rod and/or a gearing arrangement, for example. In this way a rotational movement can be easily translated into a linear movement, while at the same time a further adjustment of the exerted and resisting torques can be achieved by gear ratios, for example. The piston rod can especially be used to provide a force on a plunger or bung used to exert a pressure on the fluid.

The technical problem is also solved by a method for operating an apparatus, in particular an apparatus according to the invention, comprising the steps of running an electromechanical device with a control signal, producing a motion detector signal from a mechanical movement of said electromechanical device and influencing said control signal in dependence of said phase difference between said control signal and said motion detector signal.

By allowing the phase difference as a measure of the resisting torque or momentum or load to affect the control signal, on the one hand the reliability of the device will be improved since stalling cannot only be detected by a motion detector, but also be anticipated. Appropriate counter-measures, such as increasing the current of the control signal, can be taken. On the other hand, energy can be saved, since the electromechanical device does not need to be operated at maximum or a high level of power, since the control signal and thus power needed to operate the electromechanical device can be adapted to the actual instantaneous load of the electromechanical device. Moreover, this may also result in longer lifetimes of the constructional elements, in particular the electromechanical device and loaded parts like a drive train for example, since stress, strain and operational demands may be lower on these parts, if the electromechanical device is not constantly operated at the maximum or a higher level of power.

According to an embodiment of the method, the current of the control signal is altered depending on the phase difference between the control signal and the motion detector signal.

By altering the current of the control signal, an easy way to adjust the power to the electromechanical device is provided. In case of a stepper motor, the amplitude of the phase currents directly influences the torque or momentum exerted by the electromechanical device. In certain embodiments, the amplitude of the phase voltages of a motor may be adjusted. Instead of altering the amplitude of the currents (or voltages), the length or the shape of the pulses to control a stepper motor might also be modulated in order to reduce the effective electrical power applied to the stepper motor.

A minimised but still sufficient current can be used to ensure the exerted torque or momentum is sufficient to overcome the resisting torque on the electromechanical device and at the same time the exerted torque of the electromechanical is small enough not to waste any energy. As a result, the reliability as well as the power consumption is improved.

By averaging several phase differences between the control signal and the motion detector signal, the quality of the control can be improved. Because of errors and jitter in the measurements of the phase difference, an averaged phase difference is less prone to statistical errors or component tolerances, since the statistical or electromechanical errors largely cancel each other during averaging. Thus a more reliable and stable phase difference can be determined leading to a more precise influence on the control signal. The more samples of phase differences in time are taken the smaller the error in the phase measurement becomes. But if fewer samples are taken for averaging, the measurement for the load on the electromechanical device is determined faster, allowing for a faster reaction to changing loads on the electromechanical device.

In the case that the motion detector comprises an interrupting flag and if two detectors are used, averaging a number of samples, which number is a multiple of 4, may be particularly efficient.

If the electromechanical device is prevented from stalling by adjusting said control signal such that said exerted torque always exceeds said resisting torque of said electromechanical device, the reliability of operating the apparatus is maximized, while at the same time the power consumption is minimized. Especially for a medical device, where the electromechanical device defines the dose of a medicament to be delivered, it is essential that a precise movement of the electromechanical device is guaranteed.

It is further preferred that the current of the control signal is increased if the phase difference exceeds a threshold. The threshold can be predetermined. The threshold can rely on experimental data, so that either a driving torque on the electromechanical device can be calculated from the phase difference or a critical phase difference can be accounted for directly. The threshold can also be a variable threshold. Situation dependent variables can be taken into account in this way to further optimize the preciseness of the correlation between phase difference and torque or load on the electromechanical device. Such a variable may be the inertia of the driven load, or a measured temperature, for example. In case the apparatus is a medical device, in particular a portable medical device, characteristics of the fluids or medicaments, which are delivered, can be taken into account or the charge status of the battery.

BRIEF DESCRIPTION OF THE DRAWINGS

These as well as other advantages of various aspects of the present invention will become apparent to those of ordinary skill in the art by reading the following detailed description, with appropriate reference to the accompanying drawings, in which.

DETAILED DESCRIPTION

Figure 1:
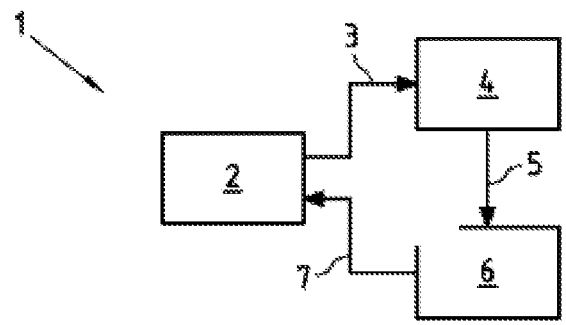
FIG. 1 illustrates a schematic diagram of an exemplary embodiment of an apparatus comprising a control unit, an electromechanical device and a motion detector.
Figure 2:
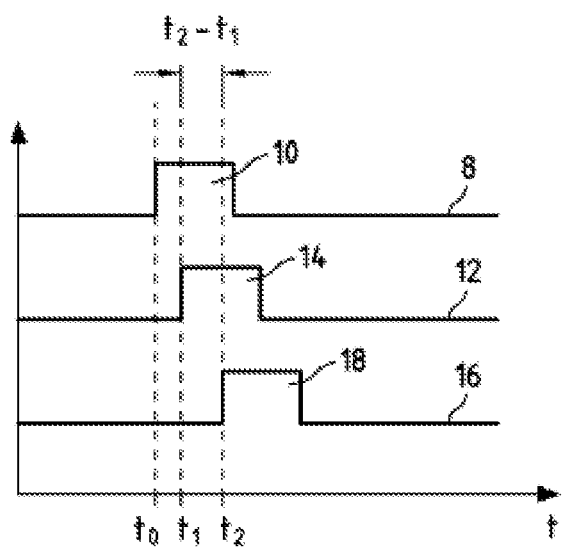
FIG. 2 illustrates a schematic diagram of an exemplary control signal and exemplary motion detector signals.

FIG. 1 and FIG. 2 illustrate a schematic diagram of an exemplary embodiment of an apparatus 1 and a schematic diagram of an exemplary control signal 8 and exemplary motion detector signals 12, 16. The apparatus 1 comprises a control unit 2, an electromechanical device 4 and a motion detector 6. The control unit 2 in this case sends a control signal 8 (which can be seen in FIG. 2) via the connection 3 to the electromechanical device 4. The mechanical movement of the electromechanical device is illustrated by the arrow 5 and is detected by the motion detector 6. The motion detector 6 then provides a motion detector signal 12, 16 (which can be seen in FIG. 2) via connection 7 influencing the control unit 2.

The control unit 2 can be any kind of microprocessor, for example. It may be a microprocessor especially dedicated to the control of the electromechanical device 4 or a general microprocessor dedicated to other tasks as well. The control unit 2 can transmit the control signal to the electromechanical device 4 by any typical connection 3 such as cables, though the control unit 2 and the electromechanical device 4 may also communicate wirelessly.

The motion detector 6 in the schematic diagram of FIG. 1 provides a motion detector signal 12, 16 directly to the control unit 2. Of course, the motion detector signal 12, 16 may also be provided indirectly to the control unit 2 via other processing units, for example.

As can be seen from FIG. 1, the illustrated apparatus 1 comprises the control unit 2, the electromechanical device 4 and the motion detector 6 and thus constitutes a closed loop control system.

Turning now to FIG. 2, the signals 8, 12, 16 are drawn in a coordinate system with the time on the x-axis and the step issued and step response on the y-axis. For better illustration, the signals are shifted in the y-direction to separate them, thus showing the time and phase relation of the pulses. The control signal 8 comprises a rising edge and a falling edge producing a single pulse 10. The rising edge of pulse 10 is at time $t_0$ in this example. Such a pulse 10 is sent from a control unit 2 to the electromechanical device 4. In the case of a stepper motor, the rising edge of pulse 10 constitutes a single step. In the case where the electromechanical device 4 can substantially move freely, which means that there is no load or no resisting torque on the electromechanical device 4, the motion detector 6 produces a motion detector signal 12 comprising a pulse 14, for example. As can be seen there is already a delay between the pulse 10 of the control signal 8 and the pulse 14 of the motion detector signal 12. The rising edge of pulse 14 is at time $t_1$. Of course there is always a delay due to the electronics and because the control signal 8 has to be sent before the motion detector signal 12 can be received. Even though this delay may be negligible, there can be a delay between pulse 10 and pulse 14. This delay depends on the way that the motion detector 6, 6a, 6b provides the motion detector signal 12, 16, and on the resolution of the motion detector signal 12, 16. For example, if an interrupting flag 32 is used as part of the motion detector 6, 6a, 6b, it depends on the position of the flags 32a, 32b of the interrupter 32 and the number of flags provided, how the pulses 10 and 14 are shifted against each other in time (see FIGS. 4, 8a and 8b for further details on the motion detector). The rotational orientation of the encoder flags is set up during the assembly process when the pinion/encoder is attached to the motor shaft. Therefore, even when there is no load upon the motor, there may be a substantial phase difference between the pulse 10 of the control signal and pulse 14 of the motion detection signal.

In certain configurations, the delay between pulse 10 and pulse 14 may be fixed, for example when the number of flags is the same as the number of pulses for one rotation of the stepper motor. If the number of pulses to the stepper motor for one rotation is an integer multiple n of the number of flags of the motion detector, there is a fixed delay between every n-th pulse 10 to the stepper motor and pulse 14 from the motion detector. This fixed delay can be determined when the motor is driven without a load, for example.

The signal 16 is also a motion detector signal. In this case the electromechanical device 4 is under load. The resisting torque on the electromechanical device 4 influences the movement of the electromechanical device 4 in such a way, that the movement is substantially shifted in time compared to an electromechanical device 4 not being under load. This can be seen from signal 16 comprising a pulse 18, which comprises a rising edge at time $t_2$. The difference between the pulse 14 of signal 12 and pulse 18 of signal 16 is denoted as a time difference $t_2-t_1$ between the rising edges of the pulses 14 and 18 in FIG. 2. Of course, other characteristics of the pulse, such as the falling edge, can be used to determine the phase difference. This time difference can also be expressed as a phase difference in terms of a periodic signal, while a complete period of that periodic signal corresponds in particular to 360 degrees.

Normally, the time difference $t_2-t_0$ is measured including the delay $t_1-t_0$. But since the delay $t_1-t_0$ may be a fixed delay as described above, it can be accounted for by subtracting $t_1-t_0$ from the measured time difference $t_2-t_0$ in order to obtain the time difference $t_2-t_1$ as a measure for the phase difference between the unloaded electromechanical device and the electromechanical device under load.

The time or phase difference between control signal 8 and motion detector signal 16 can be used as a measure of the load on the electromechanical device 4. Thus the control unit 2 can alter the amplitude, which is in this case the current or voltage, of the control signal 8 in dependence of the time or phase difference. There may be a value, for example an empirically determined value, for the maximum time or phase difference between control signal 8 and motion detector signal 12, 16 before the electromechanical device 4 either starts to slip, in case the electromechanical device 4 is a stepper motor, or even stalls. This maximum time or phase difference can also be based upon theoretical calculations. Such theoretical calculations may for example include the stepping rate, or the inertia of the load that is being driven. The maximum phase difference can for example be 90 degrees. In order to provide a reliable operation of the electromechanical device, such high phase differences (that are close to the slipping or stalling conditions) can be avoided and a much lower phase difference is preferably maintained.

Figure 3:
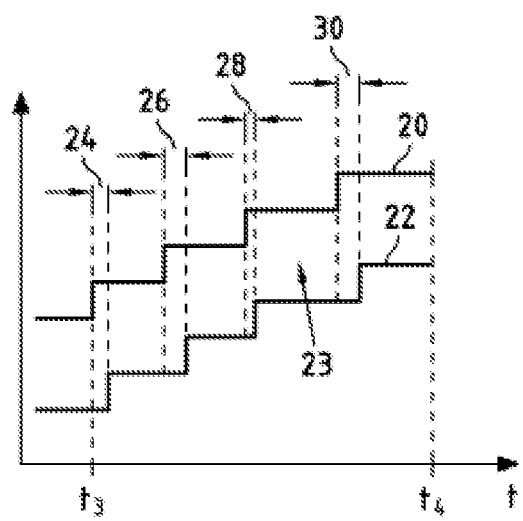
FIG. 3 illustrates another schematic diagram of a step function representing the desired movement of the electromechanical device according to the control signal and a step function representing the movement of the electromechanical device according to the motion detector signal.

FIG. 3 illustrates another schematic diagram of a step function 20 representing the desired movement of the electromechanical device 4 according to the control signal 8 and a step function 22 representing the movement of the electromechanical device 4 according to the motion detector signal 12, 16. The signals are drawn in a coordinate system with the time on the x-axis and the amplitude, in particular the step movement, on the y-axis. For better illustration, the signals are shifted in the y-direction to separate them. Each step in the step functions 20, 22 represents a movement of the electromechanical device. As can be seen, the ratio between instructed steps by the control unit 2 and the steps detected by the motion detector 6 is 1:1. Other ratios are possible as well, for example by altering the number of flags of the interrupter of the motion detector per rotation. In this example a stepper motor is used and each step in the step function represents a step of the stepper motor. It can be seen from FIG. 3 that when the time differences 24, 26, 28, 30 between the step as indicated by the control signal 20 and the step as indicated by the motion detector signal 22 increases, the area between the two functions 20, 22 increases and vice versa. Thus the area 23 between the functions 20, 22 can also be used as a measure for the time difference or phase difference and thus for the load or the resisting torque on the electromechanical device 4.

As illustrated in FIG. 3, the time difference or phase difference between two correlated steps of the two functions 20, 22 can change for successive steps. For example, phase difference 30 is larger than phase difference 28. This is not only due to a changing load on the electromechanical device, but also due to measurement inaccuracies. By using the area 23 between multiple steps as a measure of the load or the resisting torque on the electromechanical device, in FIG. 3 for example between time $t_3$ and $t_4$, an averaging can be achieved, providing a time difference or a phase difference with a lower statistical error.

For example, if the phase differences 24, 26, 28 and 30 are denoted $\varphi_{24}$, $\varphi_{26}$, $\varphi_{28}$ and $\varphi_{30}$, respectively, then the average phase difference $\varphi_{av}$ can be calculated as $$\varphi_{av}=(\varphi_{24}+\varphi_{26}+\varphi_{28}+\varphi_{30})/4.$$

Or, in general: $\varphi_{av}=1/n\Sigma\varphi_i$ (i=1 ... n)

The relation between the measurable time differences delta t ($\Delta t$) of the signals and the signal phase differences delta phi ($\Delta\varphi$), such as $\varphi_{24}$, $\varphi_{26}$, $\varphi_{28}$ and $\varphi_{30}$, can be calculated as $$\Delta\varphi=2\Pi*\Delta t/t_{STEP}$$

Here, $t_{STEP}$ is the time interval between the pulses of the control signal, where each pulse of the control signal issues one step to the motor.

Alternatively, $\Delta\varphi$ can be calculated as $$\Delta\varphi=\Delta t/t_{cyc}*2\Pi*k.$$

Here, $t_{cyc}$ is the time of one full motor cycle, and k is the number of pulses generated by the motion detector for one motor rotation, which usually corresponds to the number of flags of the interrupter.

A higher averaging effect for the calculation of $\varphi_{av}$ can be achieved by increasing the number n of phase differences in the formula for $\varphi_{av}$ above.

Based on the determined phase difference or average phase difference, the energy to the motor can be controlled, for example by controlling the current (or voltage) applied to the motor, or by modulating the pulse signal. One example of controlling the voltage or current applied to the motor by modulation is pulse width modulation "PWM". This means that a voltage is applied to the motor in a number of smaller pulses, and the (combined) pulse width of the smaller pulses is varied according to the desired energy level at the motor. In an alternative embodiment, the circuit voltage of the motor is increased directly in order to increase the current (and thus the power) to the motor.

As the load that the motor drives is increased, the time difference t increases by an amount delta t ($\Delta t$) and the phase difference phi ($\varphi$) increases by an amount delta phi ($\Delta\varphi$). The parameters of the time difference $\Delta t$ and/or phase difference $\Delta\varphi$ are used to measure the load torque that the motor is driving.

In yet another embodiment, the torque load may depend on the motor speed. In such a case, the motor speed may be reduced in order to cope with higher loads, for example by reducing the frequency of the pulses of the control signal, i.e. the frequency at which steps are issued to the motor.

Figure 4:
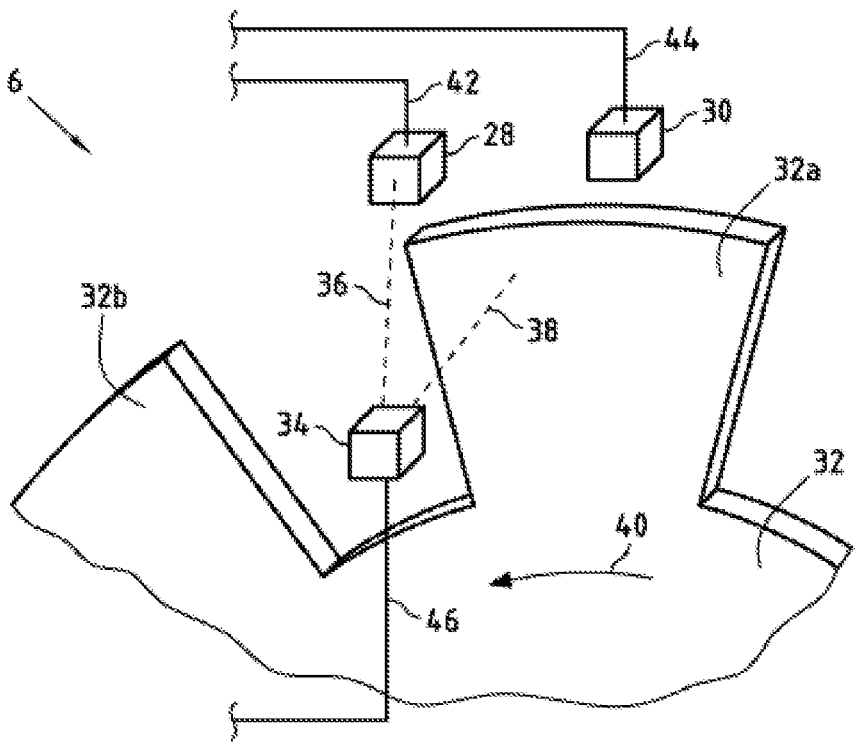
FIG. 4 illustrates an exemplary embodiment of a motion detector with two detectors.

FIG. 4 illustrates an exemplary embodiment of a motion detector 6 with two detectors 28, 30. The detectors 28, 30 are arranged on one side of an optical interrupter 32 substantially defining a plane. Any other number of detectors, for example a single detector, would work, too. (A single detector, however, may not be capable of detecting the direction of movement.) The optical interrupter 32 is in this case a substantially flat disc, having blocking elements 32*a*, 32*b* in form of blades, flags or wings. The number of these blocking elements 32*a*, 32*b* influences the ratio between steps of the control signal and detected steps of the motion detector 6. On the other side of the plane defined by the optical interrupter 32 there is an emission source 34, for example a light source. The emission source 34, the detectors 28, 30 and the optical interrupter 32 are arranged such that the flags 32*a*, 32*b* of the optical interrupter 32 can block the optical paths 36, 38 between the emission source 34 and the detectors 28, 30 depending on the position of the flags 32*a*, 32*b* etc. of optical interrupter 32. The emission source 34 can be of any kind as long as the detectors 28, 30 can detect the emitted radiation of the emission source 34.

The optical interrupter 32 can be mounted on the pinion 92 of the electromechanical device 4, for example, but as well on any other mechanically moving part suitable to detect the mechanical movement of the electromechanical device 4. The optical interrupter 32 rotates as illustrated by the arrow 40. The detectors and the emission source have a fixed position in this embodiment. However, it is only relevant that the optical interrupter 32 is moving relative to the emission source 34 and the detectors 28, 30. For a single blocking element 32*a*, 32*b* there are four detectable states while moving past the detectors 28, 30 and the emission source 34: both detectors 28, 30 receive an optical signal, only detector 28 receives an optical signal, neither detector receives an optical signal and finally only detector 30 receives a signal. Substantially due to these four stages, it is especially efficient to average over a number of detected steps which is a multiple of four.

The detectors 28, 30 can be connected directly to the control unit 2 or any other sort of processing unit capable of processing the output of the detectors 28, 30. The emission source 34 is connected to a power source by the connection 46.

Experimental results indicate that phase delay is proportional to the load. Stalling may for example occur when the phase delay is approximately 90 degrees.

Figure 5:
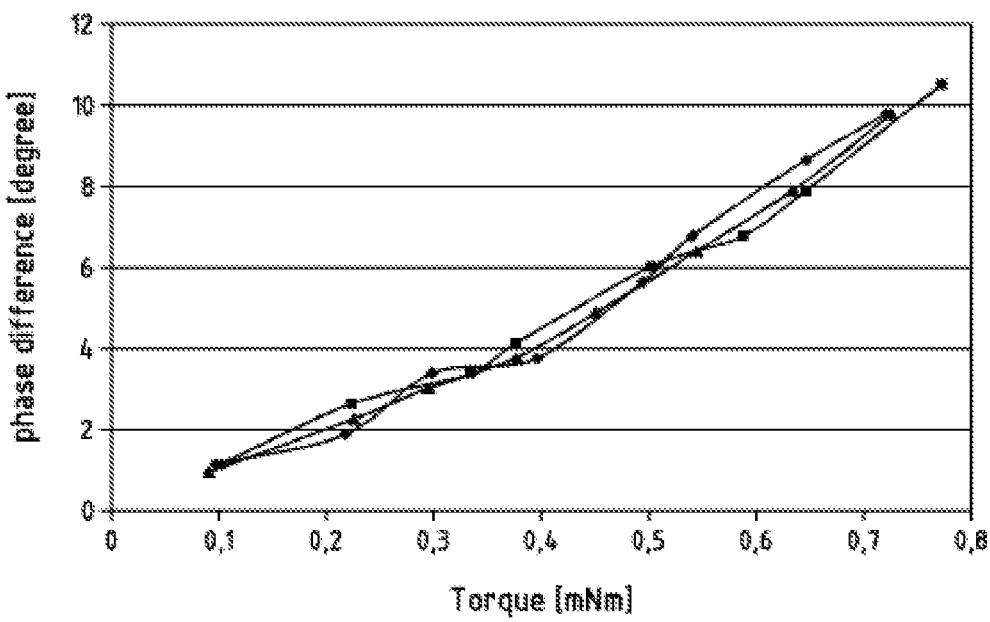
FIG. 5 illustrates a diagram showing three series of measurements of a measured phase difference between the control signal and the motion detector signal as a function of a measured resisting torque on a stepper motor.

FIG. 5 illustrates a diagram showing three series of measurements of the phase difference between the control signal 8 and the motion detector signal 12, 16 on the y-axis as a function of the measured resisting torque upon an electromechanical device 4 in the form of a stepper motor on the x-axis.

In FIG. 5, the phase difference is shown as an angle of rotation of the stepper motor shaft. Since in this example, the motor has 8 steps per revolution, the phase angle $\varphi$ is 8 times as large as the angle of rotation of the motor shaft.

In FIG. 5, the maximum angle of the stepper motor shaft is approximately 10.8 degrees, and this corresponds to a phase angle $\varphi$ of 10.8*8=86.4 degrees. This is very close to 90 degrees. If the motor load was increased further, the phase difference would increase beyond 90 degrees and the motor would stall.

Thus, a rule for controlling the motor can be derived that may be described as follows:
  send p pulses to the motor;
  receive q pulses from the encoder;
  determine (averaged) phase delay;
  if phase delay <70 degrees: reduce motor power by X;
  if phase delay >80 degrees: increase motor power by Y.

X and Y may be absolute measures (such as 0.01 Ampere for the motor current) or relative measures (such as 2%). The thresholds of 70 and 80 degrees may depend, for example on overall system requirements, and they may be selected in such a way to guarantee reliable and power efficient operation of the motor and stability of the control system.

While the resisting torque rises from about 0.1 to about 0.8 mNm, the phase difference in degrees rises substantially linearly and repeatable from about 1 to 90 degrees. Due to this unambiguous relation the torque can be concluded from the phase difference.

In the following figures components of a drug delivery device for the delivery of two drugs is described. The use of an apparatus and a method according to the invention is especially advantageous in such medical devices, since an accurate dose delivery of a certain medicament or drug is of great importance, since over and under dosages can be deadly in the worst case. Thus, if a fluid, in particular a medicament or a drug, is delivered by the movement of the electromechanical device 4, it is important to provide a reliable and predictable movement of the electromechanical device 4.

Figure 6:
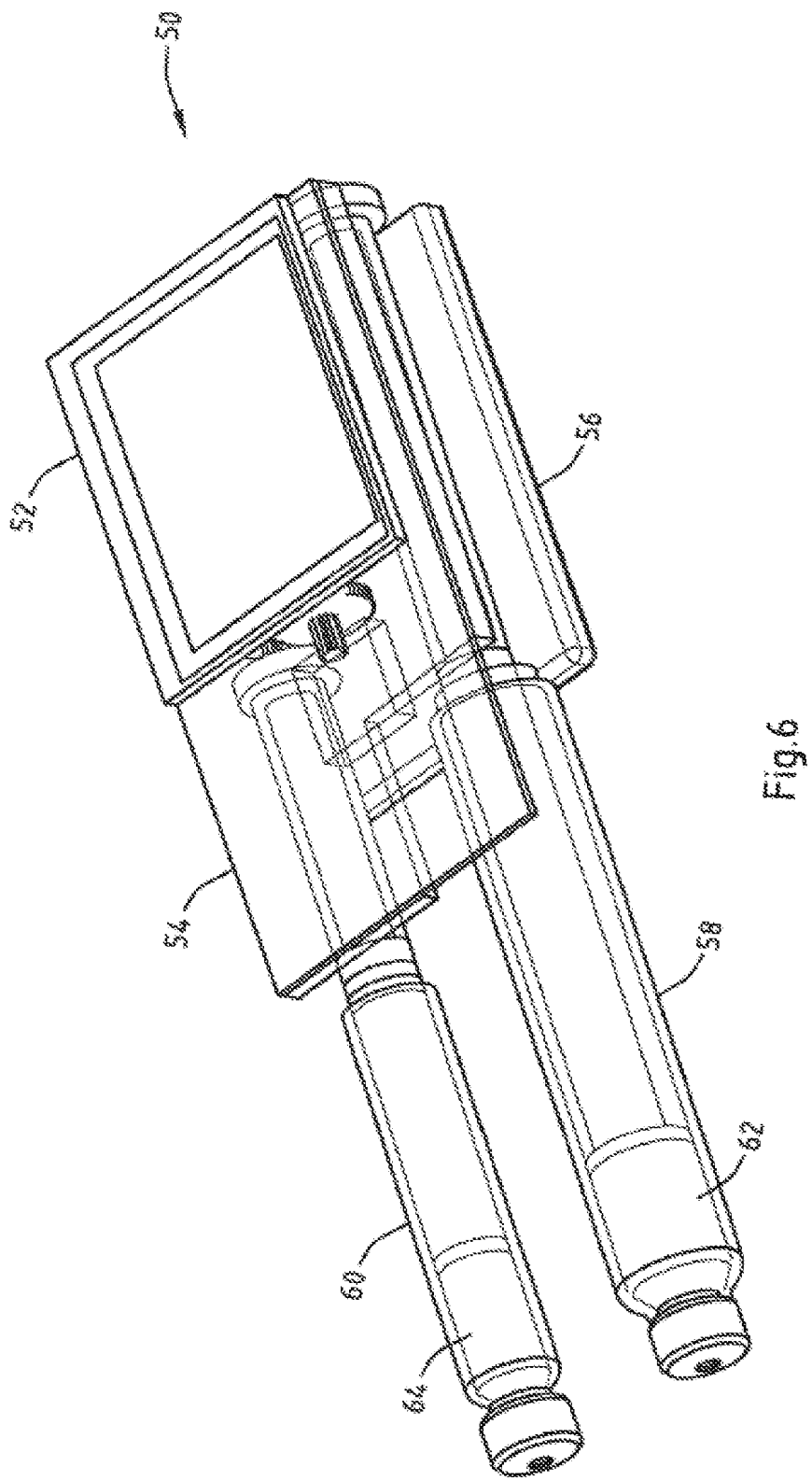
FIG. 6 illustrates a schematic view of a drive mechanism for use with a drug delivery device.

FIG. 6 illustrates various internal components of a drug delivery device including one preferred arrangement of a drive train 50. FIG. 6 also illustrates a digital display 52, a printed circuit board assembly (PCBA) 54, along with a power source or battery 56. The PCBA 54 may be positioned between the digital display 52 and a drive train 50 with the battery or power source 56 positioned beneath this drive train 50. The battery or power source 52 is electronically connected to provide power to the digital display 52, the PCBA 54 and the drive train 50. As illustrated, both a first and second cartridges 58, 60 are shown in an expended state. That is, the first and second cartridges are illustrated in an empty state having a stopper 62, 64 at a most distal position. For example, the first cartridge 58 (which ordinarily contains a first medicament) is illustrated as having its stopper 62 in the distal position. The stopper 64 of the second cartridge 60 (ordinarily containing the second medicament) is illustrated in a similar position.

With reference to FIG. 6, it may be seen that there is provided a first region defining a suitable location for a power source 56 such as a replaceable battery or batteries. The power source 56 may comprise a rechargeable power source and may be recharged while the power source 56 remains in the device. Alternatively, the power source 56 may be removed from the drug delivery device and recharged externally, for example, by way of a remote battery charger. This power source may comprise a Lithium-Ion or Lithium-polymer power source. In this preferred arrangement, the battery 56 comprises a generally flat and rectangular shaped power source.

Figure 7:
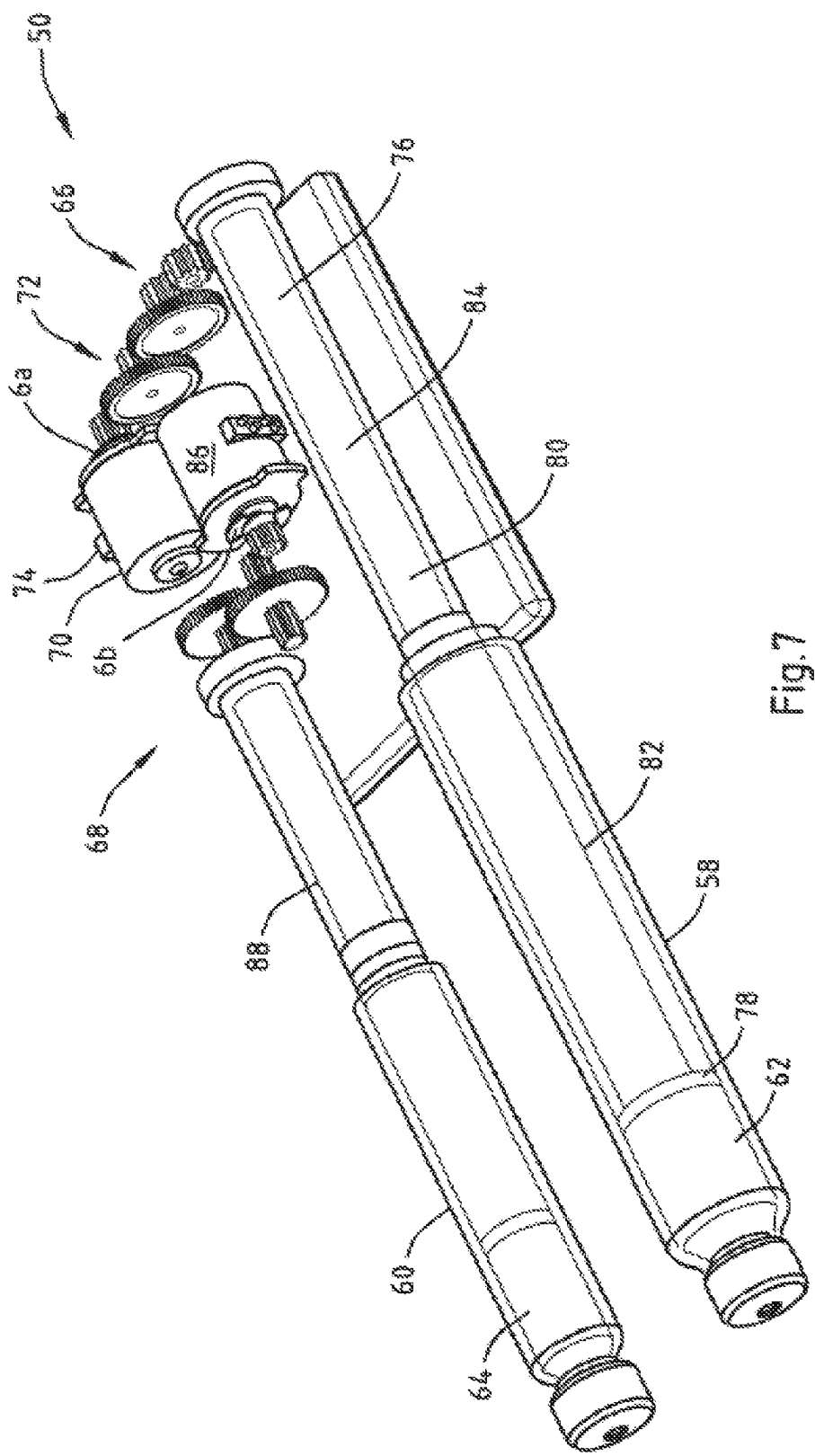
FIG. 7 illustrates another schematic view of the drive mechanism illustrated in FIG. 6 and FIG. 8*a-b* illustrate a motion detector that may be used with the drive mechanism illustrated in FIG. 6.

FIG. 7 illustrates the arrangement of the electro-mechanical system illustrated in FIG. 6 with both the digital display 52 and the PCBA 54 omitted. As illustrated in FIG. 7, the drive train 50 operates to expel a dose from the first cartridge 58 containing the primary medicament and the second cartridge 60 containing the secondary medicament. Again, as illustrated in FIG. 7, the first and second cartridges 58, 60 are illustrated in an empty state having stoppers at a most distal position.

In this preferred drive train 50, the system comprises an independent electromechanical device for each cartridge 58, 60. That is, an independent mechanical driver 66 operates to expel a dose from the first cartridge 58 and an independent mechanical driver 68 operates to expel a dose from the second cartridge 60. In an alternative drive train 50 operating on three different medicaments, three independent mechanical drivers could be provided. The independent mechanical drivers can act under control of motor drivers of a control unit 2 (see, e.g., FIG. 1).

The first independent mechanical driver 66 operates to expel a dose from the first cartridge 58. This first driver 66 comprises a first electromechanical device 4 in form of a motor 70 that is operatively coupled to a first gearing arrangement 72. To energize this motor 70, a connector 74 is provided as a means of electrically connecting to the motor driver. This first gearing arrangement 72 is mechanically linked to a proximal portion of the first telescoping piston rod 76. The first telescoping piston rod 76 is illustrated in a fully extended position having a distal end 78 acting on the stopper 62 of the first cartridge 58.

As this gearing arrangement 72 is driven by the output shaft of the first motor 70, this arrangement 72 rotates the proximal portion 80 of the first telescoping piston rod 76. As this proximal portion 80 of the piston rod 76 is rotated, the second or distal portion 82 of the piston rod 76 is driven in a distal direction.

Preferably, the proximal portion 80 of the telescope piston rod 76 comprises an external thread 84. This thread 84 engages the distal portion 82 which has in integrated nut comprising a short threaded section at a proximal end of the distal portion 82. This distal portion 82 is prevented from rotating via a key acting in a keyway. Such a keyway may pass through the middle of first telescope 76. Therefore, when the first gearbox arrangement 72 causes rotation of the proximal section 80, rotation of the proximal portion 80 acts upon the distal end 78 to thereby drive the distal portion of telescope piston rod to extend along the longitudinal axis.

Moving in this distal direction, the distal end 78 of the second portion 82 of the piston rod 76 exerts a force on a stopper 62 contained within the first cartridge 58. With this distal end 78 of the piston rod 76 exerting a force on the stopper, the user selected dose of the first medicament is forced out of the cartridge 58 and into an attached dispense interface, for example, and then out an attached needle assembly which can allow the user to inject the medicament.

A similar injection operation occurs with the second independent driver 68 when a controller first determines that a dose of a second medicament is called for and determines the amount of this dose. In certain circumstances, the controller may determine that a dose of the second medicament may not be called for and therefore this second dose would be "set" to a "0" dose.

Preferably, motors 70, 86 comprise motors suitable for electronic commutation. Most preferably, such motors may comprise either a stepper motor or a brushless DC motor.

To inject a dose of the primary and secondary medicaments a user will first select a dose of the primary medicament by way of the human interface components on the display 52 (see, e.g., FIG. 6).

When the dose sizes of the first and second medicaments have been established, the motor drivers energize both the first and the second motors 70, 86 to begin the injection process described above.

The piston rods 76, 88 are preferably movable between a first fully withdrawn position (not shown) and a second fully extended portion (as shown in FIGS. 6 and 7). With the piston rods 76, 88 in the withdrawn position, the user will be allowed to open up the respective cartridge retainer and remove an empty cartridge.

In one preferred arrangement, both the first and second motors 70, 86 operate simultaneously so as to dispense the user selected dose of the first medicament and the subsequently calculated dose of the second medicament simultaneously. That is, both the first and the second independent mechanical drivers 66, 68 are capable of driving the respective piston rods 76, 88 either at the same or a different time.

One or more of the steps of the injection may be performed automatically, for example controlled by a microcontroller, for example by the control unit 2, such as the step of rewinding the first and/or second piston rod. In an alternative arrangement, the microcontroller may be programmed so that the first and the second independent mechanical drivers 66, 68 may be operated to dispense either the first medicament or the second medicament prior to the other medicament. Thereafter, the second or the primary medicament may then be dispensed. In one preferred arrangement, the secondary medicament is dispensed before the primary medicament.

Preferably both motors 70, 86 may be operated in a reverse direction. This feature may be required in order to allow the piston rods 76, 88 to be moved between a first and a second position.

The first independent mechanical driver 66 illustrated in FIG. 7 comprises a first motion detector 6*a*. FIG. 8*a* illustrates a perspective view of the first motor 70 illustrated in FIG. 7. FIG. 8*b* illustrates a preferred motion detector 6*a* comprising the first motor 70 illustrated in FIG. 8*a* in conjunction with a detector 28, 30 in form of a digital encoder 90.

As illustrated in FIGS. 8*a* and 8*b*, such a motion detector 6*a* may be beneficial as it is utilized to provide operational and positional feedback from the first independent driver 66 to the control unit of the drug delivery device. For example, with respect to the first independent driver 66, a preferred motion detector 6*a* is achieved through the use of a first motor pinion 92. This first pinion 92 operatively coupled to an output shaft 94 of the first motor 70. The first pinion 92 comprises a rotating gearing portion 96 that drives a first gear of the first gearing arrangement 72 (see, e.g., FIG. 7). The first motor pinion 92 also comprises a plurality of flags 98 a-b. In this first motion detector 6*a*, the first pinion 92 comprises a first flag 98*a* and a second flag 98*b*. These two flags 98*a*-*b* are positioned on the motor pinion 92 so that they pass through a first optical encoder 90 as the motor output shaft 94 and hence the connected first pinion 92 rotate when the motor is driven.

Preferably, as the first and second flags 98*a-b* pass through the first optical encoder 90, the encoder 90 can send certain electrical pulses to a microcontroller, for example the control unit 2. Preferably, the optical encoder 90 sends two electrical pulses per motor output shaft revolution to the microcontroller. As such, the microcontroller can therefore monitor motor output shaft rotation. This is advantageous to detect position errors or events that could occur during a dose administration step such as jamming of the drive train, incorrect mounting of a dispense interface or a needle assembly, or where there is a blocked needle.

Preferably, the number of distinguishable signals received from the motion detector per revolution of the motor is equal to the number of pulses from the control unit that produces one revolution of the motor. For example, the motor may rotate one full rotation for 20 steps. In this case the number of flags of the interrupter can be 5 (for 4 signal edges for each transition of the flag through the interrupter) or 10 (for 2 signal edges).

Preferably, the first pinion 92 comprises a plastic injection molded pinion. Such a plastic injection molded part may be attached to the output motor shaft 94. The optical encoder 90 may be located and attached to a gearbox housing. Such a housing may contain both the first gearing arrangement 72 along with the optical encoder 90. The encoder 90 is preferably in electrical communication with the control unit 2 potentially via a flexible portion of the PCB. In a preferred arrangement, the second independent mechanical driver 68 illustrated in FIGS. 6 and 7 comprises a second motion detector 6*b* that operates in a similar and preferably in the same fashion as the first motion detector 6*a* of the first mechanical driver 66.

The term "drug" or "medicament", as used herein, means a pharmaceutical formulation containing at least one pharmaceutically active compound, wherein in one embodiment the pharmaceutically active compound has a molecular weight up to 1500 Da and/or is a peptide, a proteine, a polysaccharide, a vaccine, a DNA, a RNA, an enzyme, an antibody or a fragment thereof, a hormone or an oligonucleotide, or a mixture of the above-mentioned pharmaceutically active compound, wherein in a further embodiment the pharmaceutically active compound is useful for the treatment and/or prophylaxis of diabetes mellitus or complications associated with diabetes mellitus such as diabetic retinopathy, thromboembolism disorders such as deep vein or pulmonary thromboembolism, acute coronary syndrome (ACS), angina, myocardial infarction, cancer, macular degeneration, inflammation, hay fever, atherosclerosis and/or rheumatoid arthritis, wherein in a further embodiment the pharmaceutically active compound comprises at least one peptide for the treatment and/or prophylaxis of diabetes mellitus or complications associated with diabetes mellitus such as diabetic retinopathy, wherein in a further embodiment the pharmaceutically active compound comprises at least one human insulin or a human insulin analogue or derivative, glucagon-like peptide (GLP-1) or an analogue or derivative thereof, or exedin-3 or exedin-4 or an analogue or derivative of exedin-3 or exedin-4.

Insulin analogues are for example Gly(A21), Arg(B31), Arg(B32) human insulin; Lys(B3), Glu(B29) human insulin; Lys(B28), Pro(B29) human insulin; Asp(B28) human insulin; human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Insulin derivates are for example B29-N-myristoyl-des (B30) human insulin; B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-Y-glutamyl)-des(B30) human insulin; B29-N—(N-lithocholyl-Y-glutamyl)-des(B30) human insulin; B29-N-(ω-carboxyheptadecanoyl)-des(B30) human insulin and B29-N-(ω-carboxyhepta¬decanoyl) human insulin.

Exendin-4 for example means Exendin-4(1-39), a peptide of the sequence (SEQ ID NO: 1)
H His-Gly-Glu-Gly-Thr-Phe-Thr-Ser-Asp-Leu-Ser- Lys-Gln-Met-Glu-Glu-Glu-Ala-Val-Arg-Leu-Phe- Ile-Glu-Trp-Leu-Lys-Asn-Gly-Gly-Pro-Ser-Ser- Gly-Ala-Pro-Pro-Pro-Ser-NH2.

Exendin-4 derivatives are for example selected from the following list of compounds:

H-(Lys)4-des Pro36, des Pro37 Exendin-4(1-39)-NH2,
H-(Lys)5-des Pro36, des Pro37 Exendin-4(1-39)-NH2,
des Pro36 [Asp28] Exendin-4(1-39),
des Pro36 [IsoAsp28] Exendin-4(1-39),
des Pro36 [Met(O)14, Asp28] Exendin-4(1-39),
des Pro36 [Met(O)14, IsoAsp28] Exendin-4(1-39),
des Pro36 [Trp(O2)25, Asp28] Exendin-4(1-39),
des Pro36 [Trp(O2)25, IsoAsp28] Exendin-4(1-39),
des Pro36 [Met(O)14 Trp(O2)25, Asp28] Exendin-4(1-39),
des Pro36 [Met(O)14 Trp(O2)25, IsoAsp28] Exendin-4(1-39); or
des Pro36 [Asp28] Exendin-4(1-39),
des Pro36 [IsoAsp28] Exendin-4(1-39),
des Pro36 [Met(O)14, Asp28] Exendin-4(1-39),
des Pro36 [Met(O)14, IsoAsp28] Exendin-4(1-39),
des Pro36 [Trp(O2)25, Asp28] Exendin-4(1-39),
des Pro36 [Trp(O2)25, IsoAsp28] Exendin-4(1-39),
des Pro36 [Met(O)14 Trp(O2)25, Asp28] Exendin-4(1-39),
des Pro36 [Met(O)14 Trp(O2)25, IsoAsp28] Exendin-4 (1-39),
wherein the group -Lys6-NH2 may be bound to the C-terminus of the Exendin-4 derivative;
or an Exendin-4 derivative of the sequence
H-(Lys)6-des Pro36 [Asp28] Exendin-4(1-39)-Lys6-NH2,
des Asp28 Pro36, Pro37, Pro38Exendin-4(1-39)-NH2,
H-(Lys)6-des Pro36, Pro38 [Asp28] Exendin-4(1-39)-NH2,
H-Asn-(Glu)5des Pro36, Pro37, Pro38 [Asp28] Exendin-4(1-39)-NH2,
des Pro36, Pro37, Pro38 [Asp28] Exendin-4(1-39)-(Lys)6-NH2,
H-(Lys)6-des Pro36, Pro37, Pro38 [Asp28] Exendin-4(1-39)-(Lys)6-NH2,
H-Asn-(Glu)5-des Pro36, Pro37, Pro38 [Asp28] Exendin-4(1-39)-(Lys)6-NH2,
H-(Lys)6-des Pro36 [Trp(O2)25, Asp28] Exendin-4(1-39)-Lys6-NH2, H-des Asp28 Pro36, Pro37, Pro38 [Trp(O2)25] Exendin-4(1-39)-NH2, H-(Lys)6-des Pro36, Pro37, Pro38 [Trp(O2)25, Asp28] Exendin-4(1-39)-NH2, H-Asn-(Glu)5-des Pro36, Pro37, Pro38 [Trp(O2)25, Asp28] Exendin-4(1-39)-NH2, des Pro36, Pro37, Pro38 [Trp(O2)25, Asp28] Exendin-4(1-39)-(Lys)6-NH2, H-(Lys)6-des Pro36, Pro37, Pro38 [Trp(O2)25, Asp28] Exendin-4(1-39)-(Lys)6-NH2, H-Asn-(Glu)5-des Pro36, Pro37, Pro38 [Trp(O2)25, Asp28] Exendin-4(1-39)-(Lys)6-NH2, H-(Lys)6-des Pro36 [Met(O)14, Asp28] Exendin-4(1-39)-Lys6-NH2, des Met(O)14 Asp28 Pro36, Pro37, Pro38 Exendin-4(1-39)-NH2, H-(Lys)6-desPro36, Pro37, Pro38 [Met(O)14, Asp28] Exendin-4(1-39)-NH2, H-Asn-(Glu)5-des Pro36, Pro37, Pro38 [Met(O)14, Asp28] Exendin-4(1-39)-NH2, des Pro36, Pro37, Pro38 [Met(O)14, Asp28] Exendin-4(1-39)-(Lys)6-NH2, H-(Lys)6-des Pro36, Pro37, Pro38 [Met(O)14, Asp28] Exendin-4(1-39)-(Lys)6-NH2, H-Asn-(Glu)5 des Pro36, Pro37, Pro38 [Met(O)14, Asp28] Exendin-4(1-39)-(Lys)6-NH2, H-Lys6-des Pro36 [Met(O)14, Trp(O2)25, Asp28] Exendin-4(1-39)-Lys6-NH2, H-des Asp28 Pro36, Pro37, Pro38 [Met(O)14, Trp(O2)25] Exendin-4(1-39)-NH2, H-(Lys)6-des Pro36, Pro37, Pro38 [Met(O)14, Asp28] Exendin-4(1-39)-NH2, H-Asn-(Glu)5-des Pro36, Pro37, Pro38 [Met(O)14, Trp(O2)25, Asp28] Exendin-4(1-39)-NH2, des Pro36, Pro37, Pro38 [Met(O)14, Trp(O2)25, Asp28] Exendin-4(1-39)-(Lys)6-NH2, H-(Lys)6-des Pro36, Pro37, Pro38 [Met(O)14, Trp(O2)25, Asp28] Exendin-4(S1-39)-(Lys)6-NH2, H-Asn-(Glu)5-des Pro36, Pro37, Pro38 [Met(O)14, Trp(O2)25, Asp28] Exendin-4(1-39)-(Lys)6-NH2;

or a pharmaceutically acceptable salt or solvate of any one of the aforementioned Exedin-4 derivative.

Hormones are for example hypophysis hormones or hypothalamus hormones or regulatory active peptides and their antagonists as listed in Rote Liste, ed. 2008, Chapter 50, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, Goserelin.

A polysaccharide is for example a glucosaminoglycane, a hyaluronic acid, a heparin, a low molecular weight heparin or an ultra low molecular weight heparin or a derivative thereof, or a sulphated, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium.

Antibodies are globular plasma proteins (~150 kDa) that are also known as immunoglobulins which share a basic structure. As they have sugar chains added to amino acid residues, they are glycoproteins. The basic functional unit of each antibody is an immunoglobulin (Ig) monomer (containing only one Ig unit); secreted antibodies can also be dimeric with two Ig units as with IgA, tetrameric with four Ig units like teleost fish IgM, or pentameric with five Ig units, like mammalian IgM.

The Ig monomer is a "Y"-shaped molecule that consists of four polypeptide chains; two identical heavy chains and two identical light chains connected by disulfide bonds between cysteine residues. Each heavy chain is about 440 amino acids long; each light chain is about 220 amino acids long. Heavy and light chains each contain intrachain disulfide bonds which stabilize their folding. Each chain is composed of structural domains called Ig domains. These domains contain about 70-110 amino acids and are classified into different categories (for example, variable or V, and constant or C) according to their size and function. They have a characteristic immunoglobulin fold in which two β sheets create a "sandwich" shape, held together by interactions between conserved cysteines and other charged amino acids.

There are five types of mammalian Ig heavy chain denoted by α, δ, ε, γ, and μ. The type of heavy chain present defines the isotype of antibody; these chains are found in IgA, IgD, IgE, IgG, and IgM antibodies, respectively.

Distinct heavy chains differ in size and composition; α and γ contain approximately 450 amino acids and δ approximately 500 amino acids, while μ and ε have approximately 550 amino acids. Each heavy chain has two regions, the constant region (CH) and the variable region (VH). In one species, the constant region is essentially identical in all antibodies of the same isotype, but differs in antibodies of different isotypes. Heavy chains γ, α and δ have a constant region composed of three tandem Ig domains, and a hinge region for added flexibility; heavy chains μ and ε have a constant region composed of four immunoglobulin domains. The variable region of the heavy chain differs in antibodies produced by different B cells, but is the same for all antibodies produced by a single B cell or B cell clone. The variable region of each heavy chain is approximately 110 amino acids long and is composed of a single Ig domain.

In mammals, there are two types of immunoglobulin light chain denoted by λ and κ. A light chain has two successive domains: one constant domain (CL) and one variable domain (VL). The approximate length of a light chain is 211 to 217 amino acids. Each antibody contains two light chains that are always identical; only one type of light chain, κ or λ, is present per antibody in mammals.

Although the general structure of all antibodies is very similar, the unique property of a given antibody is determined by the variable (V) regions, as detailed above. More specifically, variable loops, three each the light (VL) and three on the heavy (VH) chain, are responsible for binding to the antigen, i.e. for its antigen specificity. These loops are referred to as the Complementarity Determining Regions (CDRs). Because CDRs from both VH and VL domains contribute to the antigen-binding site, it is the combination of the heavy and the light chains, and not either alone, that determines the final antigen specificity.

An "antibody fragment" contains at least one antigen binding fragment as defined above, and exhibits essentially the same function and specificity as the complete antibody of which the fragment is derived from. Limited proteolytic digestion with papain cleaves the Ig prototype into three fragments. Two identical amino terminal fragments, each containing one entire L chain and about half an H chain, are the antigen binding fragments (Fab). The third fragment, similar in size but containing the carboxyl terminal half of both heavy chains with their interchain disulfide bond, is the crystalizable fragment (Fc). The Fc contains carbohydrates, complement-binding, and FcR-binding sites. Limited pepsin digestion yields a single F(ab')2 fragment containing both Fab pieces and the hinge region, including the H—H interchain disulfide bond. F(ab')2 is divalent for antigen binding. The disulfide bond of F(ab')2 may be cleaved in order to obtain Fab'. Moreover, the variable regions of the heavy and light chains can be fused together to form a single chain variable fragment (scFv).

Pharmaceutically acceptable salts are for example acid addition salts and basic salts. Acid addition salts are e.g. HCl or HBr salts. Basic salts are e.g. salts having a cation selected from alkali or alkaline, e.g. Na+, or K+, or Ca2+, or an ammonium ion N+(R1)(R2)(R3)(R4), wherein R1 to R4 independently of each other mean: hydrogen, an optionally substituted C1 C6-alkyl group, an optionally substituted C2-C6-alkenyl group, an optionally substituted C6-C10-aryl group, or an optionally substituted C6-C10-heteroaryl group. Further examples of pharmaceutically acceptable salts are described in "Remington's Pharmaceutical Sciences" 17. ed. Alfonso R. Gennaro (Ed.), Mark Publishing Company, Easton, Pa., U.S.A., 1985 and in Encyclopedia of Pharmaceutical Technology.

Pharmaceutically acceptable solvates are for example hydrates.

tor signal pulse based on a comparison of an edge of each control signal pulse and a corresponding edge of the corresponding motion detector signal pulse,
(iv) determine an average phase difference based on the determined respective phase differences, and
(v) modify the control signal based on the average phase difference to reduce power provided to the electromechanical device when the average phase difference is less than a first threshold value thereby reducing a resulting torque exerted by the electromechanical device to drive the drive train, and to increase the power provided to the electromechanical device when the average phase difference is greater than a second threshold value thereby increasing the resulting torque exerted by the electromechanical device to drive the drive train; and
wherein the modified control signal of the electromechanical device modifies the torque exerted by the electromechanical device to drive the drive train to address a change in a resistive torque on the electromechanical device to be overcome for accurate delivery

---

---

The invention claimed is:

1. A hand-held portable drug delivery device comprising:
   a drive train configured to exert a pressure on a fluid comprising a medicament in a reservoir coupled to or disposed in the hand-held portable drug delivery device for delivery of the medicament;
   an electromechanical device configured to exert a torque to drive the drive train to exert the pressure on the fluid for delivery of the medicament;
   a control unit configured to control the electromechanical device by a control signal; and
   a motion detector configured to provide a motion detector signal indicative of a mechanical movement produced by the torque exerted by the electromechanical device to drive the drive train to exert the pressure on the fluid for delivery of the medicament, wherein the motion detector comprises an interrupter, an emission source, and at least one detector,
   wherein the control unit is configured to:
   (i) provide a sequence of control signal pulses to the electromechanical device,
   (ii) receive a corresponding sequence of motion detector signal pulses,
   (iii) determine a respective phase difference between each control signal pulse and a corresponding motion detector signal pulse based on a comparison of an edge of each control signal pulse and a corresponding edge of the corresponding motion detector signal pulse,
   of a selected dose of the medicament from the reservoir using the hand-held portable drug delivery device.

2. The hand-held portable drug delivery device according to claim 1, wherein the control unit is configured such that a current of the control signal is altered depending on the average phase difference.

3. The hand-held portable drug delivery device according to claim 1, wherein the electromechanical device is a stepper motor or a brushless DC-motor.

4. The hand-held portable drug delivery device according to claim 1, wherein the control signal is adjusted such that the exerted torque of the electromechanical device always exceeds the resistive torque on the electromechanical device when an active torque is being applied by the electromechanical device.

5. The hand-held portable drug delivery device according to claim 1, further comprising:
   the reservoir containing the fluid; and
   a fluidic channel connected-to the reservoir,
   wherein the electromechanical device is configured such that it drives the drive train to exert the pressure-on the fluid in the reservoir such that the fluid is guided through the fluidic channel.

6. A method for operating a hand-held portable drug delivery device including a drive train, an electromechanical device configured to drive the drive train, a control unit, and a motion detector, the method comprising the steps of:

running the electromechanical device based on a sequence of control signal pulses from the control unit to exert a torque to drive the drive train to exert a pressure on a fluid comprising a medicament in a reservoir coupled to or disposed in the hand-held portable drug delivery device;

using a motion detector comprising an interrupter, an emission source, and at least one detector to produce a corresponding sequence of motion detector signal pulses indicative of a mechanical movement produced by the torque exerted by the electromechanical device to drive the drive train to exert the pressure on the fluid for delivery of the medicament;

determining a respective phase difference between each control signal pulse and a corresponding motion detector signal pulse based on a comparison of an edge of each control signal pulse and a corresponding edge of the corresponding motion detector signal pulse;

determining an average phase difference based on the determined respective phase differences; and modifying a control signal to the electromechanical device in dependence on the average phase difference to reduce power provided to the electromechanical device when the average phase difference is less than a first threshold value thereby reducing a torque exerted by the electromechanical device to drive the drive train, and to increase power provided to the electromechanical device when the average phase difference is greater than a second threshold value thereby increasing the torque exerted by the electromechanical device to drive the drive train, wherein modification of the torque exerted by the electromechanical device to drive the drive train addresses a change in a resistive torque on the electromechanical device to be overcome for accurate delivery of a selected dose of the medicament from the reservoir using the hand-held portable drug delivery device.

7. The method according to claim 6, wherein a current of the control signal is altered depending on the average phase difference.

8. The method according to claim 6, wherein the electromechanical device is prevented from stalling by adjusting the control signal such that the exerted torque always exceeds the resistive torque on the electromechanical device when an active torque is being applied by the electromechanical device.

9. The method according to claim 6, wherein a current of the control signal is increased if the average phase difference exceeds a threshold.

10. The hand-held portable drug delivery device according to claim 1, wherein the second threshold value is greater than the first threshold value.

11. The hand-held portable drug delivery device according to claim 1, wherein the at least one detector comprises two detectors configured and arranged to receive illumination from the emission source, and wherein the interrupter is disposed between the emission source and the two detectors.

12. The hand-held portable drug delivery device according to claim 11, wherein the two detectors and the emission source are disposed in fixed positions relative to each other, wherein the interrupter is configured to move relative to the emission source and the two detectors such that at least two blocking elements of the interrupter are configured to detect four detectable states while moving relative to the emission source and the two detectors.

13. The hand-held portable drug delivery device according to claim 12, wherein the four detectable states are: both detectors receive an optical signal; only a first detector of the two detectors receives an optical signal; only a second detector of the two detectors receives an optical signal; and neither detector receives an optical signal.

* * * * *

SEQUENCE LISTING

<160> NUMBER OF SEQ ID NOS: 1

<210> SEQ ID NO 1
<211> LENGTH: 39
<212> TYPE: PRT
<213> ORGANISM: Artificial Sequence
<220> FEATURE:
<223> OTHER INFORMATION: Exendin-4 or Exendin-4(1-39)

<400> SEQUENCE: 1

```
His Gly Glu Gly Thr Phe Thr Ser Asp Leu Ser Lys Gln Met Glu Glu
1               5                   10                  15

Glu Ala Val Arg Leu Phe Ile Glu Trp Leu Lys Asn Gly Gly Pro Ser
            20                  25                  30

Ser Gly Ala Pro Pro Pro Ser
        35
```